United States Patent
Pezeshkpour et al.

(10) Patent No.: US 11,042,710 B2
(45) Date of Patent: Jun. 22, 2021

(54) USER-FRIENDLY EXPLANATION PRODUCTION USING GENERATIVE ADVERSARIAL NETWORKS

(71) Applicant: FUJITSU LIMITED, Kawasaki (JP)

(72) Inventors: Pouya Pezeshkpour, Irvine, CA (US); Ramya Malur Srinivasan, San Diego, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 16/278,604

(22) Filed: Feb. 18, 2019

(65) Prior Publication Data

US 2020/0125640 A1 Apr. 23, 2020

Related U.S. Application Data

(60) Provisional application No. 62/747,010, filed on Oct. 17, 2018.

(51) Int. Cl.
*G06F 40/30* (2020.01)
*G06F 40/211* (2020.01)
*G06Q 40/02* (2012.01)

(52) U.S. Cl.
CPC ............ *G06F 40/30* (2020.01); *G06F 40/211* (2020.01); *G06Q 40/025* (2013.01)

(58) Field of Classification Search
CPC ...... G06Q 40/025; G06F 40/30; G06F 40/211
USPC .......................................................... 704/9
See application file for complete search history.

(56) References Cited

U.S. PATENT DOCUMENTS

| | | | | |
|---|---|---|---|---|
| 2018/0293711 A1* | 10/2018 | Vogels | ................... | G06T 15/005 |
| 2018/0357514 A1* | 12/2018 | Zisimopoulos | ...... | G06N 3/0472 |
| 2018/0365212 A1 | 12/2018 | Banerjee et al. | | |
| 2019/0028608 A1* | 1/2019 | Kang | ................... | H04N 1/4413 |
| 2019/0114348 A1* | 4/2019 | Gao | ..................... | H04L 9/0662 |
| 2019/0188260 A1* | 6/2019 | Hewitt | ................... | G06F 40/253 |
| 2019/0287230 A1* | 9/2019 | Lu | ......................... | G06T 7/0004 |

(Continued)

OTHER PUBLICATIONS

Rich Farmbrough, "Generative adversarial network", Wikipedia, Feb. 18, 2020.

(Continued)

*Primary Examiner* — Michael Colucci
(74) *Attorney, Agent, or Firm* — Maschoff Brennan

(57) ABSTRACT

A method of generating text using an adversarial network includes receiving a limited dataset. The limited dataset includes real data having actual parameters and actual sentences. The method includes receiving content data that includes a concept related to a portion of the real data or that causes an issue of the real data. The method includes generating relationships between the real data and the content data. The method includes embedding the content data with the real data in an encoder output that includes content vector embedding. The method includes generating an additional parameter set that includes additional parameters and one or more additional statements. The additional parameter set may be supplemental to the real data and configured to enhance an expressiveness of a model. The method includes generating explanatory statement based on the additional parameter set and the relationships.

18 Claims, 11 Drawing Sheets

(56) References Cited

U.S. PATENT DOCUMENTS

2020/0019642 A1* 1/2020 Dua ................... G06F 16/3347
2020/0097554 A1* 3/2020 Rezagholizadeh .. G06N 3/0454

OTHER PUBLICATIONS

EP Search Report in Application No. 19201897.6 dated Feb. 26, 2020.
Bau et al., Network Dissection: Quantifying Interpretability of Deep Visual Representations, CVPR Apr. 19, 2017, pp. 1-9.
Chandrasekaran, et al., It Takes Two to Tango: Towards Theory of AI's Mind, arXiv, Oct. 2, 2017, pp. 1-21.
Chen et al., InfoGAN: Interpretable Representation Learning by Information Maximizing Generative Adversarial Nets, NIPS 2016, Dec. 5, 2016, pp. 1-9.
Denton, et al., Deep Generative Image Models Using a Laplacian Pyramid of Adversarial Networks, arXiv Jun. 18, 2015, pp. 1-10.
Doshi-Velez, et al., Towards a Rigorous Science of Interpretable Machine Learning, ArXiv Mar. 2, 2017, pp. 1-13.
Fedus, et al., MaskGAN: Better Text Generation Via Filling in the___, ICLR, Mar. 1, 2018, pp. 1-17.
Goodfellow, et al., Generative Adversarial Nets, NIPS, Jun. 10, 2014, pp. 1-9.
Gunning, Explainable Artificial Intelligence (XAI), Nov. 16, 2017, pp. 1-18.
Guo, et al., Long Text Generation Via Adversarial Training with Leaked Information, arXiv, Dec. 8, 2017, pp. 1-14.
Gurumurthy, et al., DeLiGAN: Generative Adversarial Networks for Diverse and Limited Data, arXiv, Jun. 7, 2017, pp. 1-9.
Heckel et al., Scalable and Interpretable Product Recommendations via Overlapping Co-Clustering, arXiv, Apr. 2017, pp. 1-13.
Hendricks, et al., Generating Visual Explanations, ECCV Mar. 28, 2016, pp. 1-17.
Hu, et al., Toward Controlled Generation of Text, ICML, Sep. 13, 2018, pp. 1-10.
Kocaoglu, et al., CausalGAN: Learning Causal Implicit Generative Models with Adversarial Training, ICLR Sep. 6, 2017, pp. 1-33.
Lombrozo, The Structure and Function of Explanations, Trends in Cognitive Sciences, vol. 10, No. 10, Aug. 2006, pp. 1-7.
Miller et al., Explainable AI: Beware of Inmates Running the Asylum, ArXiv Dec. 5, 2017, pp. 1-7.
Press, et al., Language Generation with Recurrent Generative Adversarial Networks without Pre-training, ArXiv Dec. 21, 2017, pp. 1-5.
Radford, et al., Unsupervised Representation Learning with Deep Convolutional Generative Adversarial Networks, ICLR, Jan. 7, 2016, pp. 1-16.
Rajeswar, et al., Adversarial Generation of Natural Language, ArXiv May 31, 2017, pp. 1-11.
Ribeiro, et al., Why Should I Trust You? Explaining the Predictions of Any Classifier, KDD Feb. 16, 2016, pp. 1-10.
Selvaraju, et al., Grad-CAM: Visual Explanations from Deep Networks via Gradient-based Localization, ArXiv Mar. 21, 2017, pp. 1-24.
Zhao, et al., Adversarially Regularized Autoencoders, ArXiv Jun. 29, 2018, pp. 1-16.
Non-Final Office Action issued in corresponding U.S. Appl. No. 16/278,609 dated Aug. 13, 2020.
EP Office Action in Application No. 19 201 897.6 dated Feb. 9, 2021.

* cited by examiner

```
if      {NumTrades60Ever2DerogPubRec=0,MSinceMostRecentDelq=-7,NumBank2NatlTradesWHighUtilization=1} (rule[259]) then positive probability = 0.57723577
else if {MaxDelq2PublicRecLast12M=4,MSinceMostRecentInqexcl7days=0} (rule[2]) then positive probability = 0.21223022
else if {NumTrades60Ever2DerogPubRec=0,MSinceMostRecentInqexcl7days=0,NumBank2NatlTradesWHighUtilization=0} (rule[274]) then positive probability = 0.66155321
else if {NumTrades90Ever2DerogPubRec=0,MSinceMostRecentDelq=-7,NumBank2NatlTradesWHighUtilization=0} (rule[413]) then positive probability = 0.80935507
else if {NumTrades90Ever2DerogPubRec=0,NetFractionInstallBurden=-8,NumBank2NatlTradesWHighUtilization=0} (rule[277]) then positive probability = 0.67857143
else if {MSinceMostRecentInqexcl7days=-7} (rule[154]) then positive probability = 0.28335950
else if {MSinceMostRecentInqexcl7days=0} (rule[166]) then positive probability = 0.30164371
else if {MaxDelq2PublicRecLast12M=6,NumBank2NatlTradesWHighUtilization=0} (rule[7]) then positive probability = 0.73989899
else (default rule) then positive probability = 0.46264368
```

*FIG. 1*

| Architecture | Broad reasoning | Specific reasoning | Generated Statements |
|---|---|---|---|
| ARAEGAN | Credit | Low credit | The loan is denied because the applicant is not enough the income |
| +DELIGAN | Credit | Low credit | The loan is denied because the applicant's income is too low |
| + Broad Reason/One Level Conditioning | Credit | Low credit | The loan is denied because the applicant has a poor credit history. |
| + Specific Reason/Two Level Conditioning | Credit | Low credit | The loan is denied because the applicant's credit score is low. |
| + Labeler and Anti-Labeler Losses | Credit | Low credit | The loan is denied because the applicant has a low credit score. |

FIG. 10

USER-FRIENDLY EXPLANATION PRODUCTION USING GENERATIVE ADVERSARIAL NETWORKS

CROSS REFERENCE TO RELATED APPLICATIONS

This application claims priority to and the benefit of U.S. provisional application 62/747,010 filed Oct. 17, 2018, which is incorporated herein by reference in its entirety. Additionally, this application is related to co-pending application entitled, "Explanations Generation With Different Cognitive Values Using Generative Adversarial Networks," Ser. No. 16/278,609 filed Feb. 18, 2019 by Pouya Pezeshkpour, Ramya Malur Shrinivasan, and Ajay Chander, which is incorporated by reference in its entirety.

FIELD

The embodiments discussed herein are related to user-friendly explanation production using generative adversarial networks.

BACKGROUND

Artificial intelligence (AI) modules may be implemented to make decisions in complex systems. Lay users, such as those who are not familiar with the inner workings of these complex systems or the parameter on which decisions are made by these systems, may not understand the outputs of AI modules. For instance, loan application systems may implement AI to process loan applications. Decisions regarding the loan applications may be determined by AI modules. However, current systems implementing the AI modules do not provide explanations of the decisions or explanations provided may be complicated and fail to provide an understandable explanation of the decisions.

Some AI modules may provide some details regarding an outputted decision. These details, however, are generally related to backend code or pseudocode that becomes visible to the user. These details fail to provide the understandable explanation that is comprehensible for a lay user. Moreover, the details may have a single purpose such as justification of the decision.

Additionally, implementation of AI modules generally rely on large data sets. Large data sets may include hundreds of thousands or millions of data showing parameters and outputs of a system. The large data sets are used to train and test machine-learning algorithms used in AI modules. Accordingly, it is difficult or impossible to generate efficient and functional AI modules in areas in which data sets are limited.

The subject matter claimed herein is not limited to embodiments that solve any disadvantages or that operate only in environments, such as those described. Rather, this background is only provided to illustrate one example technology area where some embodiments described herein may be practiced.

SUMMARY

According to an aspect of an embodiment, a method of generating text using an adversarial network may include receiving a limited dataset that includes real data having actual parameters and actual sentences. The method may include receiving content data that includes a concept that is related to a portion of the real data or that causes an issue of the real data. The method may include generating relationships between the real data and the content data. The method may include embedding the content data with the real data in an encoder output that includes content vector embedding. The method may include generating an additional parameter set that includes additional parameters and one or more additional statements. The additional parameter set may be supplemental to the real data and configured to enhance an expressiveness of a model. The method may include generating explanatory statements based on the additional parameter set and the relationships generated by the encoder.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 illustrates an example processing output;

FIG. 10 illustrates a table having some example statements that may be generated by the AI module of FIG. 3, all in accordance with at least one embodiment described herein.

DESCRIPTION OF EMBODIMENTS

Figure 2:
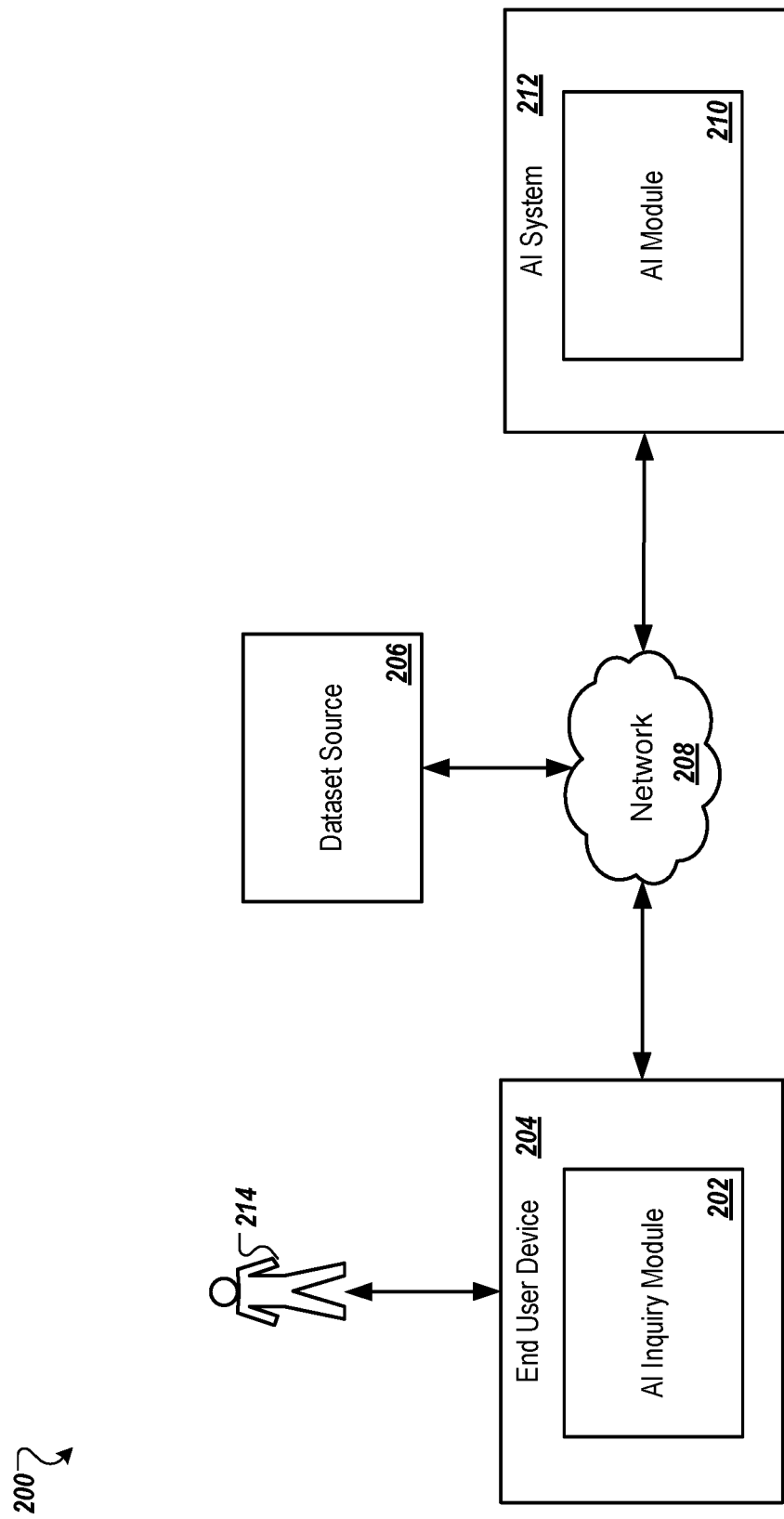
FIG. 2 illustrates a block diagram of an example operating environment.

Industries such as the financial institutions have begun developing and adopting artificial intelligence (AI) to progressively automate business processes. For instance, AI is used to predict customer behavior, verify identity for fraud detection, and intelligent chatbots that may be configured to answer customer queries. Additionally, AI may be employed in Fintech applications (e.g., technological-based banking applications and technology-based financial service applications).

Conventional AI systems may result in "black-box technologies" in which answers or decisions are provided to customers without an explanation and without any reasoning. In some systems, plain text answers or single-word decisions may be returned to a customer. However, the black-box technologies are unsuitable for certain applications. For instance, in healthcare applications, judicial applications, and some finance applications, the black box technology may be unsuitable. In particular, in these and other applications, a customer may request a complete answer and the customer interfacing with these or other applications may benefit from some additional reasoning, explanation, advice, etc. with a decision.

For example, Scalable Bayesian Rules Lists and LIME outputs may provide some backend processing to a user with a particular decision. An example of a processing output 100 is provided in FIG. 1. The example processing output 100 primarily relates to rules and pseudocode that is used in an AI process. The processing output 100 thus fails to properly explain a reason for a decision. Furthermore, the processing output 100 does not address any curative steps the user may take to help the AI module reach an alternative decision.

Additionally, some current systems that provide reasons for AI decisions utilize a large dataset to train AI models. The large datasets may include millions or tens of millions of data, for example. Large datasets are expensive to generate and access. Moreover, the large datasets used to train the AI models may contain features that are not necessarily understandable to lay or otherwise unsophisticated users. For instance, a loan application AI system may base decisions on external risk estimates, net fraction revolving burden, etc., which are complex parameters. Lay users may prefer explanations that include features that may not appear in the dataset of AI systems. It may be difficult to convert the parameters of the AI training data to features of an explanation that are understandable by the lay user. For instance, a lay user of a loan application system may be responsive to an explanation that is related to job history, background check, credit score, etc., and not to net fraction revolving burden, etc. However, to train the AI models to generate human-centered explanations, machine-learning algorithms may be implemented. Prior to implementation of the machine learning algorithms, the large dataset may be manual annotated. The manual annotation of the large dataset to generate human-centered explanations may be difficult and costly.

Accordingly, some embodiments of the present disclosure relate to a method for generating text from a limited dataset. The text may be generated in a controllable manner in which texts may be generated with broad content data and specific content data. Further, the resulting text may be converted to voice thereby rendering a chatbot like application to an end-user.

The embodiments described in the present disclosure bridge and solve a current technological limitation that exists in AI modules and generation of datasets implemented to train and test machine learning algorithms in the AI modules. In particular, the embodiments described in the present disclosure address a technological gap between research and practice by effectively generating text that provides one or more user-friendly explanations. This text may cater to the needs of the wider community of users seeking explanations and may provide multiple explanations, which may serve different purposes.

In some embodiments, the dataset may be small. As used in the present disclosure, small is used to indicate sentences of about 2000 (e.g., about 2400) sentences/use cases and with fewer than about 100 unique reasons provided for a particular decision output of an AI module. The embodiments may be employed in circumstances having more or less than about 2000 sentences/use cases and more than or less than about 100 unique reasons. For instance, a number of sentences/use cases may be about 1000, 3000, 4000, 5000, 10000, 20000, or another suitable number. Additionally, a number of unique reasons may be 40, 50, 80, 120, 140, 300, 500, or another suitable number of unique reasons.

In some embodiments, a noise input may be modeled. For instance, the noise input may be modeled using a mixture of Gaussians. Conditional information may be incorporated using one or more different embedding processes. The multiple embedding processes may help to determine which parts of an AI model the conditional information should be fed. Additionally, hierarchical conditional information (through broad and specific contents) may be used to address data sparsity and for controlled generation of text. Accuracy of terms and semantics may be improved through use of a labeler and an anti-labeler loss function. Sentences may then be generated based on the terms and semantics.

These and other embodiments are described with reference to the appended drawings. In the drawings, components and features with common item numbers have similar function and structure unless described otherwise.

FIG. 2 illustrates a block diagram of an example operating environment 200 arranged in accordance with at least one embodiment described in the present disclosure. The operating environment 200 may be configured for an interaction or an interface between an end user 214 and an artificial intelligence (AI) system 212. The interaction may include communication of information to the end user 214 via a communication network 208. The AI system 212 may be configured to generate and communicate statements related to the interaction or the interface based on a limited dataset. The statements may be user-friendly. For instance, the statements may be generated such that a lay user or an unsophisticated person may understand the statements.

The AI system 212 may include an AI module 210. The AI module 210 may be configured to generate or to include one or more adversarial networks, which are described elsewhere in the present disclosure. In particular, the AI module 210 may include a generative adversarial network (GAN), which may be implemented to generate statements that are user-friendly.

The AI module 210 represents a technical improvement to a technical problem in AI systems. For example, in current AI systems, training models to generate user-friendly statements requires large datasets with manual annotations. Manual annotation of the large datasets is costly. The AI module 210 utilizes a limited dataset. In particular, as described more below, the AI module 210 is configured to generate an additional parameter set to supplement the limited dataset. The additional parameter set enhances expressiveness of the statements. The additional parameter set may be generated using a mixture of Gaussians. Moreover, to improve the statements, a labeler loss function and an anti-labeler loss function (collectively, "loss functions") may be implemented by the AI module 210. In one or more of the GANs described in the present disclosure, the loss functions may be applied to the generated statements.

Some examples of the operating environment 200 may include or may be implemented in an IT help desk (e.g., for software updates, patches, etc.), an enterprise application (e.g., for hiring decisions, productivity assessments, resource allocations, etc.), a financial decision system (e.g., loan denials, credit score assessment, interest rate evaluations, etc.), or another suitable application or system.

The operating environment 200 may include the AI system 212, an end user device 204, the AI module 210, an AI inquiry module 202, and the end user 214, some portion of which may communicate information and data via the communication network 208. Each of the components of the operating environment 200 is briefly described below.

The communication network 208 may be configured for communication of signals between any of the components of the operating environment 200. The communication network 208 may be wired or wireless. The communication network 208 may have numerous configurations including a star configuration, a token ring configuration, or another suitable configuration. Furthermore, the communication network 208 may include a local area network (LAN), a wide area network (WAN) (e.g., the Internet), and/or other interconnected data paths across which multiple devices may communicate. In some embodiments, the communication network 208 may include a peer-to-peer network. The communication network 208 may also be coupled to or include portions of a telecommunications network that may enable communication of data in a variety of different communication protocols.

The end user device 204 and/or the AI system 212 may include a hardware-based computing system. The end user device 204 and/or the AI system 212 may be configured to communicate with other components of the operating environment 200 via the communication network 208. The end user device 204 may include the AI inquiry module 202 that enables the end user 214 to interface with the AI system 212 using the end user device 204. The AI system 212 may include the AI module 210, which may be configured to receive inquiries from the end user device 204, generate explanations and statements based thereon, and communicate explanations to the end user device 204 via the communication network 208.

The AI module 210, the AI inquiry module 202, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the AI module 210, the AI inquiry module 202, and one or more components or modules thereof may be implemented using a combination of hardware and software. Implementation in software may include rapid activation and deactivation of one or more transistors or transistor elements such as may be included in hardware of a computing system (e.g., the AI system 212 or the end user device 204). Additionally, software defined instructions may operate on information within transistor elements. Implementation of software instructions may at least temporarily reconfigure electronic pathways and transform computing hardware.

In some embodiments, the AI module 210 may be configured to generate text using an adversarial network such as the first adversarial network described below. The AI module 210 may receive the limited dataset from a dataset source 206 via the communication network 208. The dataset source 206 may include a public database or a system that accumulates and generates the limited dataset. The limited dataset may include real data, which may have actual parameters and actual sentences. The AI module 210 may also receive content data that includes a concept related to a portion of the real data or that causes an issue of the real data. The AI module 210 may generate relationships between the real data and the content data. The AI module 210 may embed the content data with the real data in an encoder output that includes content vector embedding. The AI module 210 may generate the additional parameter set that includes additional parameters and one or more additional statements. The additional parameter set may be supplemental to the real data and configured to enhance an expressiveness of a model. The AI module 210 may generate one or more explanatory, user-friendly statements based on the additional parameter set and the relationships. The AI module 210 may convert the generated statement to an audio output. The AI module 210 may then communicate the audio output to the end user 214 during a network-based interaction.

Modifications, additions, or omissions may be made to the operating environment 200 without departing from the scope of the present disclosure. For example, the operating environment 200 may include one or more end user devices 204, one or more end users 214, one or more communication networks 208, one or more AI systems 212, or any combination thereof. Moreover, the separation of various components and servers in the embodiments described herein is not meant to indicate that the separation occurs in all embodiments. For example, the AI module 210 may be implemented locally in the end user device 204 and/or the AI inquiry module 202 may implement some of the functionality of the AI module 210 or the generative adversarial networks. Moreover, it may be understood with the benefit of this disclosure that the described components and servers may generally be integrated together in a single component or server or separated into multiple components or servers.

Figure 3:
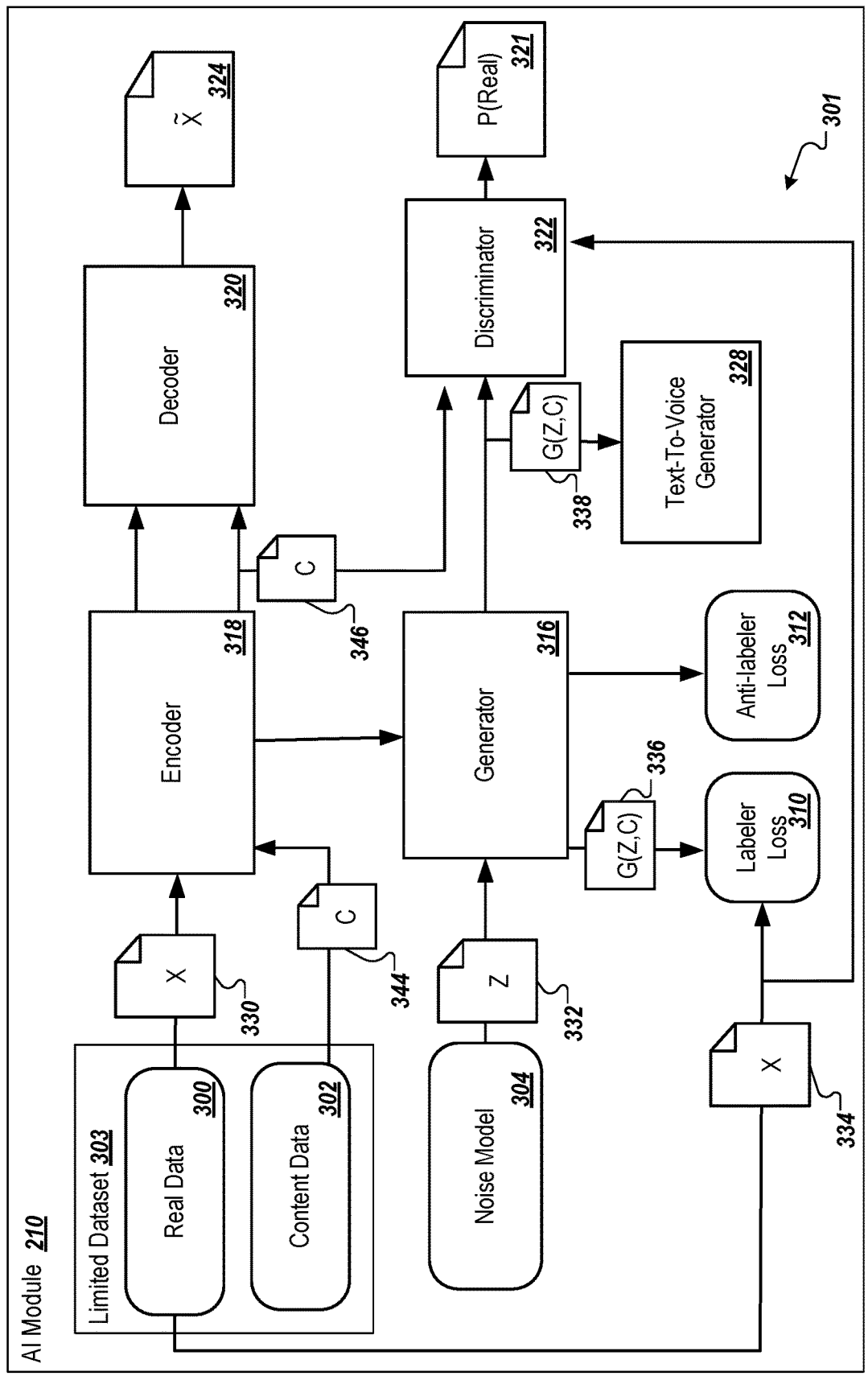
FIG. 3 illustrates an example embodiment of an artificial intelligence (AI) module that may be implemented in the operating environment of FIG. 2.

FIG. 3 illustrates an example embodiment of the AI module 210 according to at least one embodiment of the present disclosure. The AI module 210 of FIG. 3 includes a generative adversarial network (GAN) 301. The GAN 301 may be configured for text generation from a limited dataset 303. The limited dataset 303 may include limited training data. The text generated by the GAN 301 may include user-friendly explanations.

The limited dataset 303 may include real data 300. The real data 300 may be received at the AI module 210 from a dataset source via a communication network. For instance, the real data 300 may be received from a dataset source 206 via the communication network 208. The real data 300 may include a dataset that is collected through use or implementation of an application, for instance.

The real data 300 may be communicated to an encoder 318 and a labeler loss module 310 (in the figures, labeler loss 310). The indicator "X" in FIG. 3 represents the real data 300 or some portion thereof as it is communicated to other portions of the GAN 301. The real data 300 or some portion thereof represented by 330 may be an input to the encoder 318. Additionally, the real data 300 or some portion thereof represented by 334 may be an input to the labeler loss module 310. In some embodiments, the real data 300 may also be an input to a discriminator 322.

The real data 300 may include sentences, descriptions, use cases, reasons, or some combination thereof and may be manually edited and annotated. For example, in an example embodiment, the real data 300 may be collected by a group of workers such as Amazon Mechanical Turk (AMT) workers. The AMT worker provided textual descriptions highlighting reasons for loan denials. In this example embodiment, descriptions were edited for syntactic and semantic correctness. Further, linguists provided annotations for descriptions with a corresponding broad and specific reason. In this example embodiment, the real data 300 included a curated dataset of 2432 sentences with their corresponding reasons for loan denials.

Figure 9:
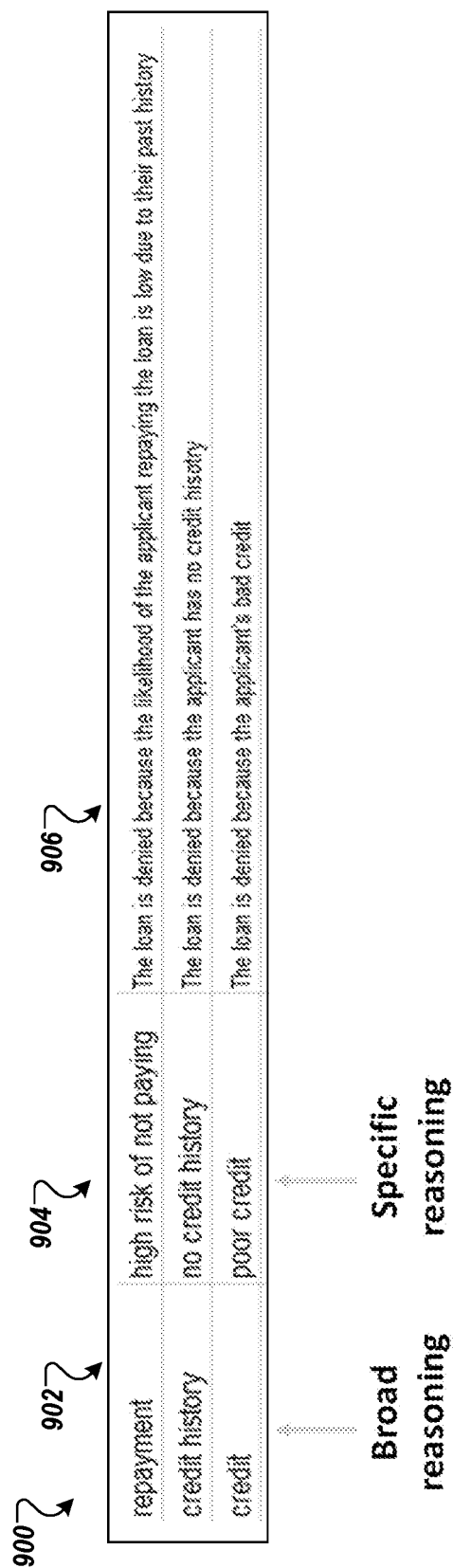
FIG. 9 illustrates an example portion of a limited dataset that may be utilized in by the AI module of FIG. 3.

With reference to FIG. 9, an example portion 900 of the limited dataset 303 is depicted. The portion 900 includes broad reasons 902 and specific reasons 904 that are related to descriptions 906. The broad reasons 902 and the specific reasons 904 may be annotated by professions such as linguists. The portions 900 also include the textual descriptions 906 highlighting reasons for loan denials. The descriptions 906 may be manually edited for syntactic and/or semantic correctness. Annotations for each description with a corresponding broad and specific reason.

Referring back to FIG. 3, the limited dataset 303 may also include content data 302. The content data 302 may include a concept that is related to a portion of the real data 300 or that causes an issue of the real data 300. In some embodiments, the content data 302 may include general or broad concepts that are found to be related to or be a cause of an issue found in the real data 300. For example, the content data 302 may include a reason that a loan application is denied such as "credit" or "income."

The content data 302 may be communicated throughout the GAN 301. For example, the content data 302 may be input to the encoder 318. The encoder 318 may be configured to generate one or more relationships between the real data 300 and the content data 302. Additionally, the content data 302 may be communicated to a decoder 320 and the discriminator 322. In FIG. 3, "C" represents the content data 302 or some portion thereof. For instance, the content data 302 or some portion thereof which is represented by 344 in FIG. 3 may be communicated to the encoder 318. Additionally, the content data 302 or some portion thereof communicated to the decoder 320 and the discriminator 322 are represented by 346 in FIG. 3.

In some embodiments, the real data 300 may include broad and specific conditions such as broad reasoning and specific reasoning for a loan denial. The broad and specific conditions may also be included in the content data 302, which is input to the encoder 318. The encoder 318 may be configured to embed the content data 302 with the real data 300.

Additionally, the GAN 301 may be configured to incorporate two-level conditional information. For example, the GAN 301 may incorporate two-level conditional information in real data 300 in a hierarchal way. In these and other embodiments, the encoder 318 may embed the content data 302 with the real data 300 in a multi (e.g., two) -level conditioning. For instance, in the example above, the curated data set may include broad reasoning for denial such as "repayment," "credit history," or "credit." The curated data set may further include specific reasoning such as "high risk of not paying," "no credit history," or "poor credit." The broad and specific reasons may be included in the content data 302 and input to the encoder 318 to be embedded with the real data 300. The encoder 318 may embed the content in a hierarchical (e.g., broad and specific) fashion with the real data 300. In other embodiments, the encoder 318 may embed the content data 302 with the real data 300 in a single-level of conditioning.

Figure 4A:
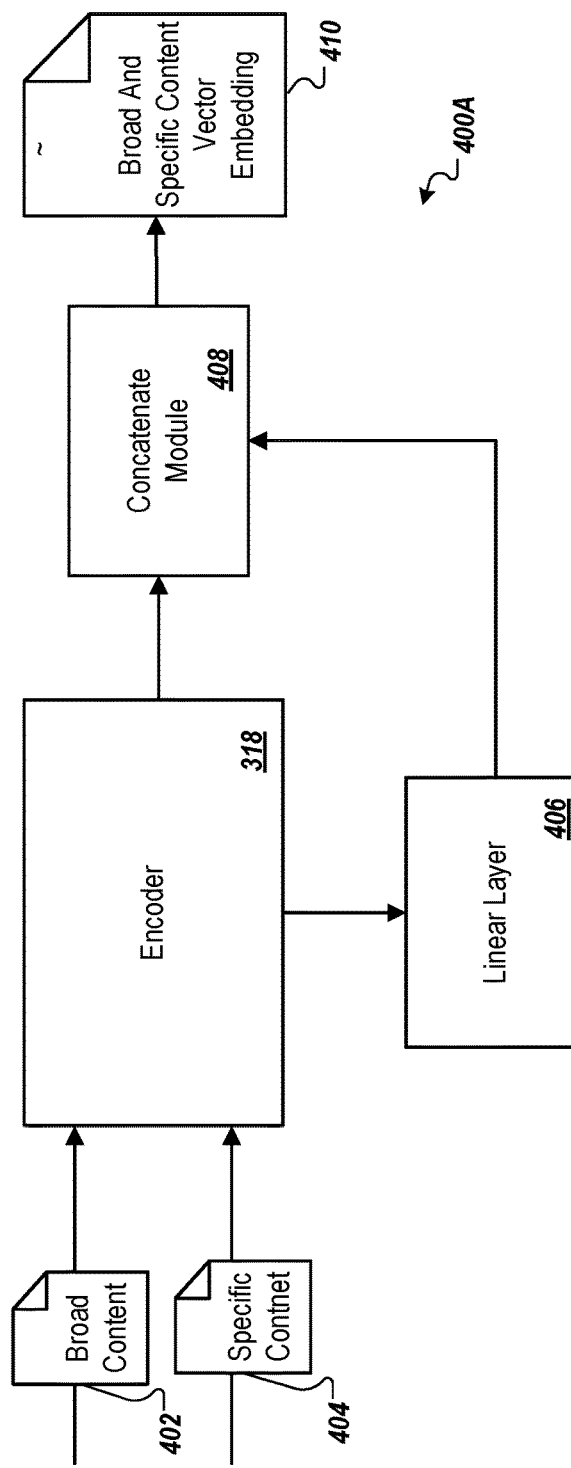
FIG. 4A illustrates a multi-level conditioning sub-system that may be implemented in the AI module of FIG. 3.
Figure 4B:
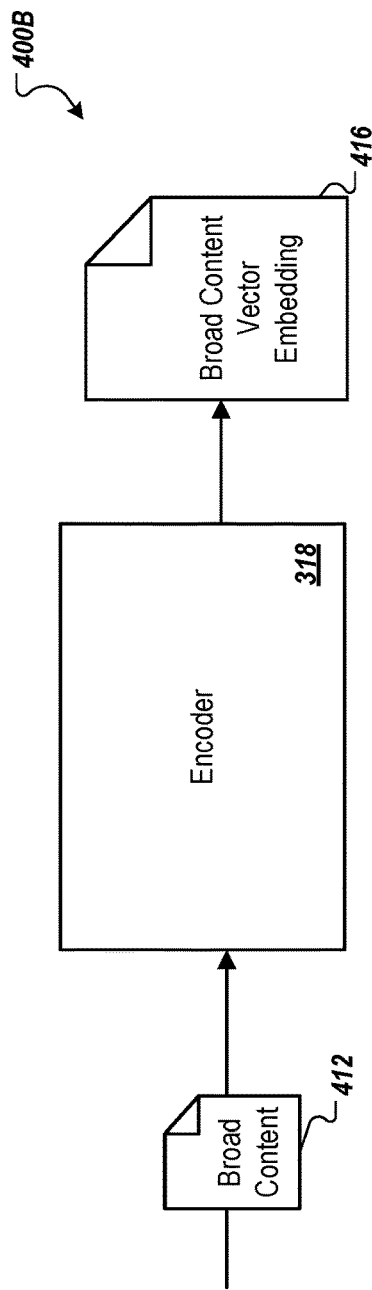
FIG. 4B illustrates a single-level conditioning sub-system that may be implemented in the AI module of FIG. 3.

For example, with reference to FIGS. 4A and 4B, example embodiments of the encoder 318 of FIG. 3 are depicted. In FIG. 4A, the encoder 318 is included in a multi-level conditioning sub-system 400A. In FIG. 4B, the encoder 318 is included in a single-level conditioning sub-system 400B. With reference to FIG. 4A, the encoder 318 may receive as input a broad content data 402 and a specific content data 404. The broad content data 402 (in FIG. 4A, "Broad Content") and the specific content data 404 (in FIG. 4A, "Specific Content") may be included or be a portion of the limited dataset 303 of FIG. 3.

The encoder 318 of FIG. 4A may output a linear layer 406. The linear layer 406 may be communicated to a concatenate module 408. The concatenate module 408 may concatenate the broad content data 402 with the specific content data 404. The concatenate module 408 may output a vector based on the broad content data 402 and the specific content data 404. For example, the vector may include the broad content data 402 concatenated with the specific content data 404. For example, the concatenate module 408 may output broad and specific content vector embedding 410. In FIG. 4A, the concatenate module 408 is separate from the encoder 318. In other embodiments, the concatenate module 408 is included in the encoder 318. In these and other embodiments, the encoder 318 may concatenate the broad content data 402 with the specific content data 404.

With reference to FIG. 4B, the single-level conditioning sub-system 400B includes broad content data 412 (in FIG. 4B, "broad content"). The broad content data 412 may be input to the encoder 318. The encoder 318 may output a vector based on the broad content data 412. For instance, the encoder 318 may output broad content vector embedding 416.

Referring back to FIG. 3, the GAN 301 may be configured to enhance expressiveness. For instance, the GAN 301 may enhance expressiveness through use of a noise model 304. The noise model 304 may model or generate noise input, which may include an additional parameter set that may supplement the limited dataset 303. In FIG. 3, the additional parameter set and the noise input is represented by "Z" 332. The noise input 332 may be modelled as a mixture of Gaussians.

Figure 5:
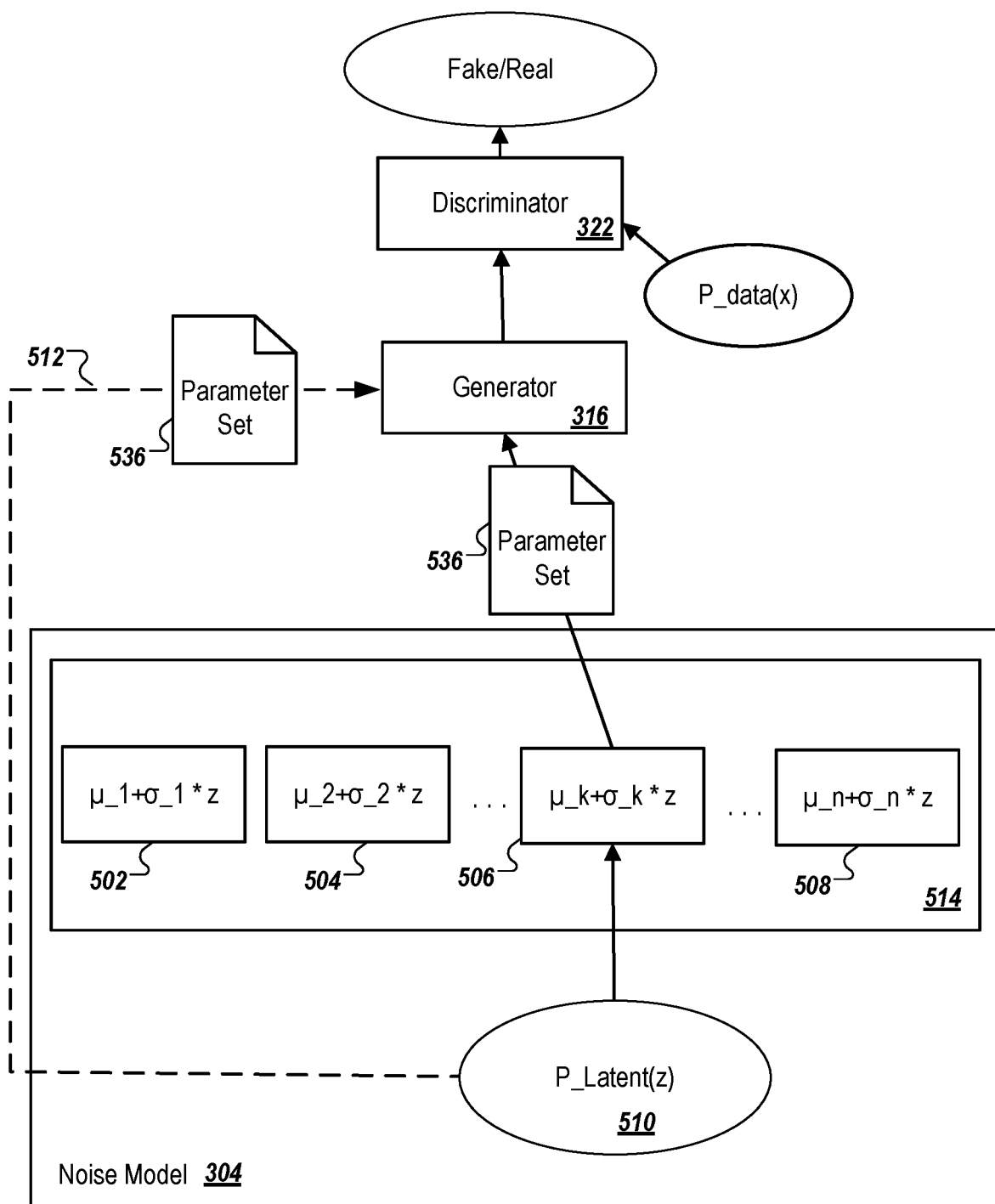
FIG. 5 illustrates an example noise module that may be implemented in the AI module of FIG. 3.

Referring to FIG. 5, a detailed view of an example embodiment of the noise model 304 is depicted. The noise model 304 is based on the Diverse and Limited GAN (referred to as a DeLiGAN) developed in Swaminathan Gurumurthy, Ravi Kiran Sarvadevabhatla, and R Venkatesh Babu. Deligan: Generative Adversarial Networks For Diverse And Limited Data. In CVPR, pages 4941-4949, 2017, which is incorporated by reference in its entirety.

The noise model 304 of FIG. 5 is depicted with a generator 316 and the discriminator 322 described elsewhere in the present disclosure. The noise model 304 may be configured to generate an additional parameter set 536 (in FIG. 5, "parameter set 536). The parameter set 536 may include one or more additional parameters and one or more additional statements. The additional parameter set 536 is configured to supplement the real data 300 of FIG. 3 and configured to enhance expressiveness. For instance, as described above, the real data 300 may be based on a limited dataset. The limited dataset may include about 2000 sentence/use-cases and about 100 unique reasons. The limited dataset may be insufficient to model and train a GAN such as the GAN 301 of FIG. 3. Accordingly, the parameter set 536 may increase a number of sentence/use-cases and/or number of unique reasons.

The noise model 304 may implement a mixture of Gaussians 502, 504, 506, and 508, which are included in a Gaussian set 514. The Gaussian set 514 may be implemented with simple latent distribution 510. A latent space is reparametrized using the Gaussian set 514. One of the Gaussian set 514 is randomly selected to generate the parameter set 536. In FIG. 5, a third Gaussian 506 is selected. In the Gaussians 502, 504, 506, and 508, z represents a deterministic function that is based on the particular Gaussian randomly selected and parameters $\sigma$ and $\mu$ described in Gurumurthy referenced above. The variables k and n are indexing variables.

In some embodiments, the noise model 304 may bypass the Gaussian set 514. For instance, in FIG. 5, the parameter set 536 may be generated based on simple latent distribution 510. This operation is shown by dashed line 512.

Referring back to FIG. 3, the generator 316 may use the additional parameter set 536 of the noise model 304 with output from the encoder 318 to generate statements. The output from the encode 318 may include the content data 302. The statements may be incorporated in sentence that may be a user-friendly explanation. The statements are represented in the figure as "G(Z,C)" which is labelled "336" and "338" in FIG. 3. The parameter "G" indicates a function of the additional parameter set from the noise model 304 and the content data 302 or 344. The statements may be communicated to the discriminator 322, the labeler loss module 310 and anti-labeler loss module 312, and a text-to-voice generator 328.

Referring to FIG. 10, a table 1000 having some example statements 1002 is depicted. The table 1000 includes differences to the statements 1002 based on an architecture 1004. As the architecture increases in complexity, the statements 1002 changes. In particular, the quality of the generated statements 1002 may become more grammatically and semantically correct.

Referring back to FIG. 3, the discriminator 322 in the GAN 301 may be configured to provide some assurance that the generator 316 is generating accurate, synthetic data. The discriminator 322 may give the signal to the generator 316 that the statements output from the generator 316 are "good" or "bad." For example, the discriminator 322 may output a binary signal to the generator 316 as feedback. Based on the feedback, the generator 316 may evolve and get better over the course of time. In summary, the discriminator 322 may be configured to indicate to the generator 316 whether the statements output from the generator 316 are good or bad.

The discriminator 322 of FIG. 3 may generate a probability 321 that one of the statements is real. For instance, in FIG. 3 the "P" stands for probability. The P(real) indicates a probability of whether the statement corresponds to "real data." The feedback to the generator 316 may be based on the probability 321.

The GAN 301 the encoder/decoder is a type of generator model, which is sometimes referred to as an auto-encoder. In general, in the GAN 301, the decoder 320 receives embedded data from the encoder 318. The decoder 320 may then perform a process that reverses the embedding process performed by the encoder 318. The decoder 320 generates an output 324 of the reversed-embedding process, which is represented by "X̂" in FIG. 3. If the embedding process of the encoder 318 is operating appropriately, the output 324 the decoder 320 may match or approximate the real data 300/330. Responsive to a mismatch between the output 324 of the decoder 320 and the real data 300/330, the encoder 318 operation may be altered.

In some embodiments, the encoder 318, the decoder 320, the generator 316, and discriminator 322 may be consistent with an adversarially regularized autoencoder GAN (ARAEGAN) architecture. Some additional details of the ARAEGAN architecture may be found in "Adversarially Regularized Autoencoders for Generating Discrete Structures, Junbo et. al., ICML PMLR 2018, which is incorporated herein by reference in its entirety.

The GAN 301 may incorporation two (or more) loss function. The loss functions are included in the GAN 301 as the labeler loss module 310 and the anti-labeler loss module 312 (collectively, loss modules 310/312). The loss modules 310/312 may improve conditional representation of the statements 336. For example, the loss modules 310/312 may be configured to evaluate the statements 336 output by the generator 316 and the real data 334. In general, the labeler loss module 310 may be configured to increase the good portions or examples of the statements 336 and the anti-labeler loss module 312 may be configured to decrease the bad portions or examples of the statements 336.

Figure 6:
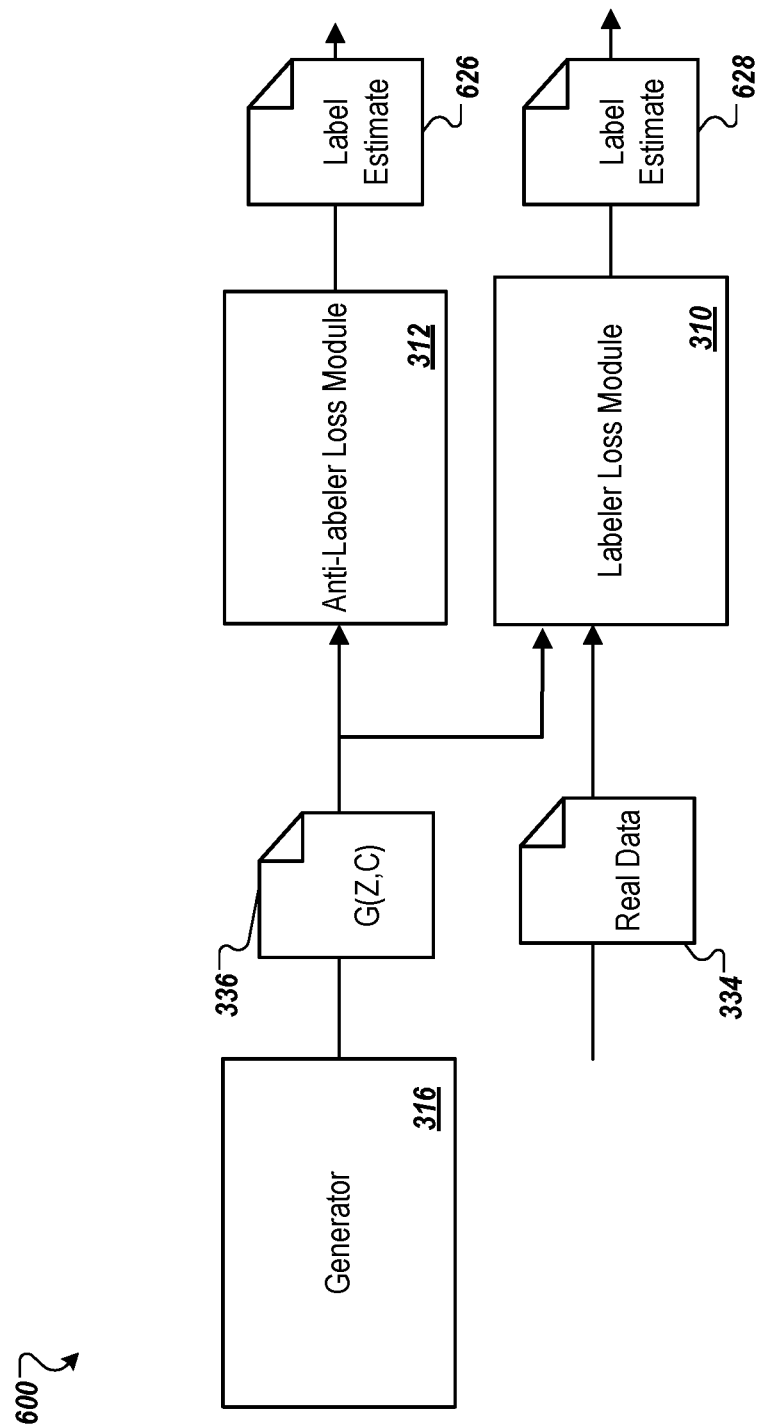
FIG. 6 illustrates an example loss module operation that may be implemented in the AI module of FIG. 3.

With reference to FIG. 6, a loss module operation 600 is depicted. The loss module operation 600 may be configured to generate label estimates 626 and 628. In the loss module operation 600, the generator 316 may output the statements 336 to the anti-labeler loss module 312 and to the labeler loss module 310. At least a portion of the real data 334 may also be input to the labeler loss module 310. The labeler loss module 310 provides an estimate of the reason based on the limited dataset 303 of FIG. 3. The anti-labeler loss module 312 provides an estimate of the reason in the statements 336 generated by the generator 316. The label estimates 626 and 628 represent estimated reasons for or involved with the statements. The label estimates 626 and 628 may be configured to improve or modify the statements output by the generator 316. Some additional details of the anti-labeler loss module 312 and the labeler loss module 310 may be found in Murat Kocaoglu et al. Causalgan: Leaning Causal Implicit Generative Models with Adversarial Training. arXiv preprint arXiv:1709.02023, 2017, which is incorporated by reference in its entirety.

The text-to-voice generator 328 may receive the statements 338 output by the generator 316. The text-to-voice generator 328 may be configured to generate an audio signal based on and representative of the statements 338. The text-to-voice generator 328 may be used to generate a chatbot that talks to an end user. For instance, with reference to FIGS. 2 and 3. An audio signal may be communicated to the end user device 204 via the communication network 208.

Figure 7:
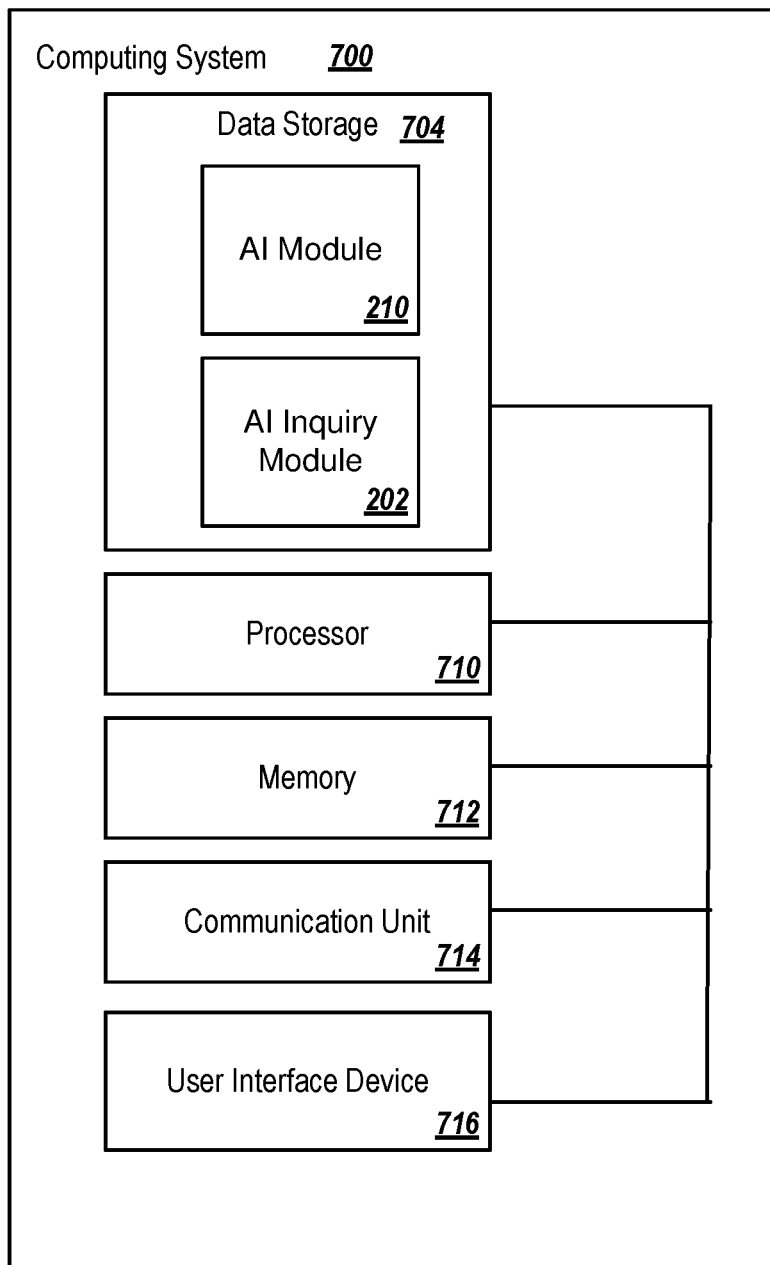
FIG. 7 is a block diagram of an example computing system that is configured for text generation.

FIG. 7 illustrates an example computing system 700 configured for text generation according to at least one embodiment of the present disclosure. The computing system 700 may be implemented in the operating environment 200 of FIG. 2, for instance. Examples of the computing system 700 may include the end user device 204 or the AI system 212. The computing system 700 may include one or more processors 710, a memory 712, a communication unit 714, a user interface device 716, and a data storage 704 that includes the AI module 210 and the AI inquiry module 202 (collectively, modules 210/202).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 208 of FIG. 2).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 210/202 may include program instructions stored in the data storage 704. The processor 710 may be configured to load the modules 210/202 into the memory 712 and execute the modules 210/202. Alternatively, the processor 710 may execute the modules 210/202 line-by-line from the data storage 704 without loading them into the memory 712. When executing the modules 210/202, the processor 710 may be configured to perform a participation verification process as described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a server, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
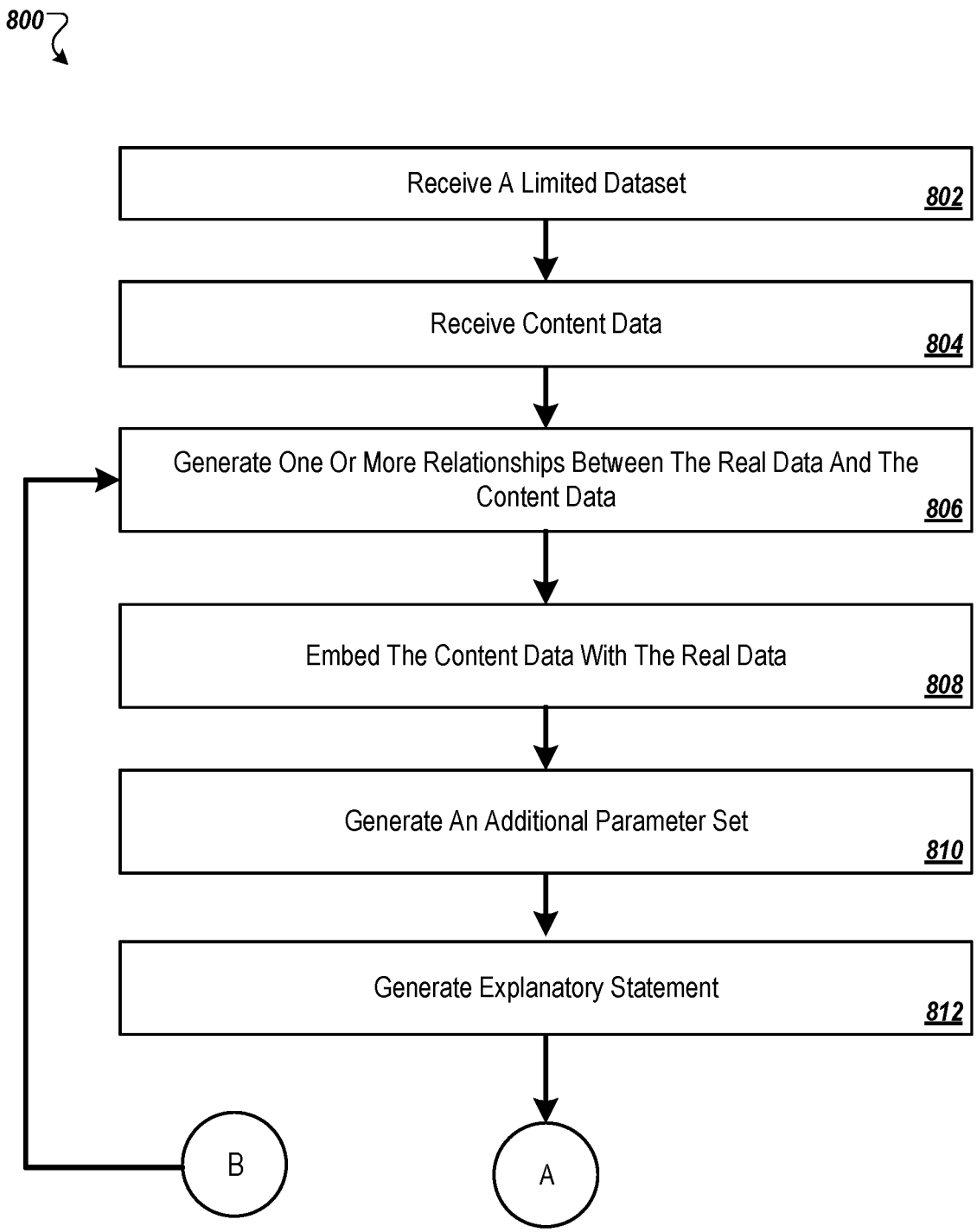
FIGS. 8A and 8B are a flow chart of an example method of text generation.
Figure 8B:
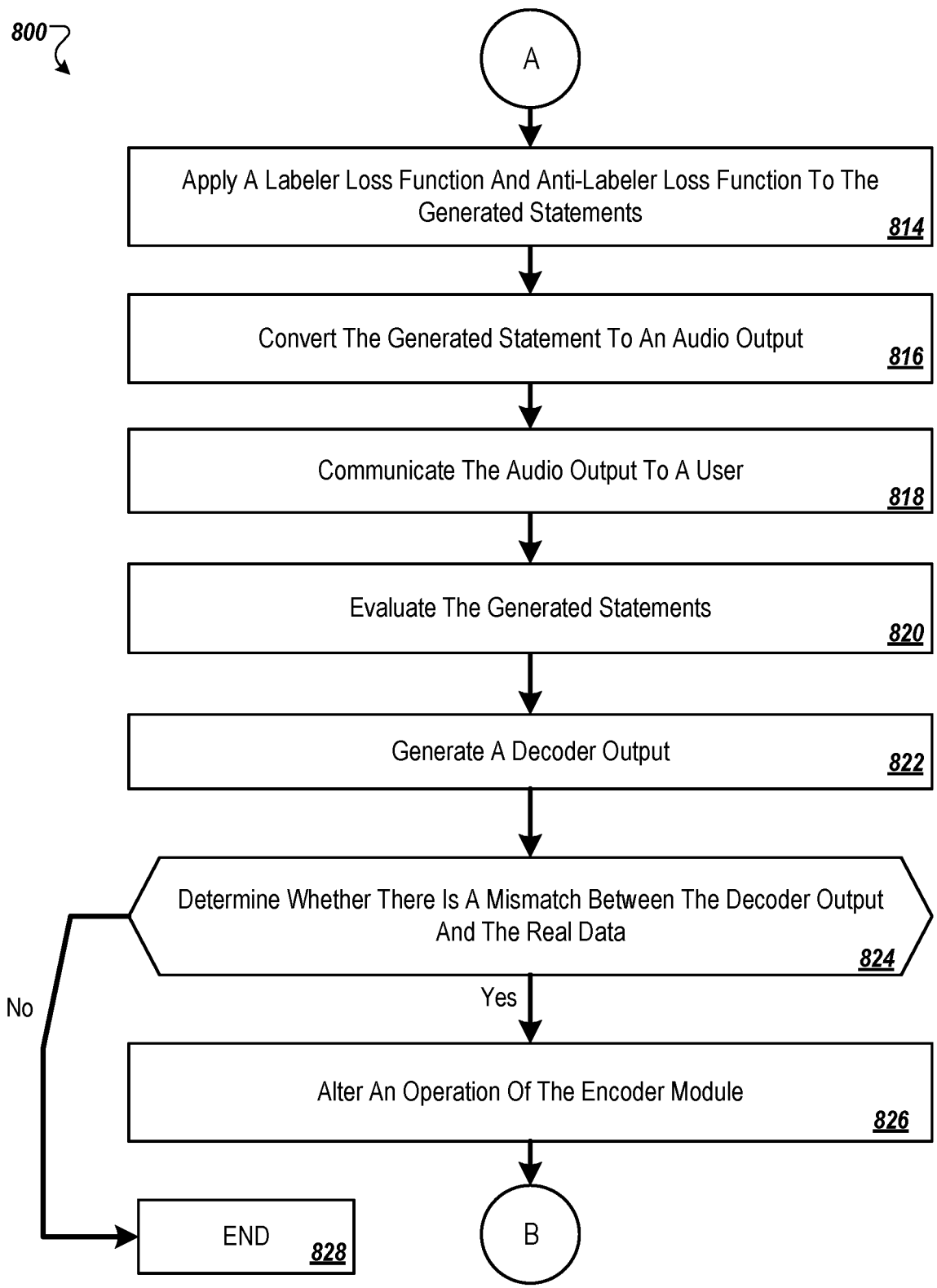

FIGS. 8A and 8B are a flow chart of an example method 800 of generating text using an adversarial network according to at least one embodiment describe in the present disclosure. The method 800 may be performed in an operating environment such as the operating environment 200 of FIG. 2. The method 800 may be programmably performed in some embodiments by the AI system 212 described with reference to FIG. 2. In some embodiments, the AI system 212 or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system and/or the AI system 212 to perform or control performance of the method 800. Additionally or alternatively, the AI system 212 may include the processor 710 described elsewhere in this disclosure that is configured to execute computer instructions to cause the AI system 212 or another computing system to perform or control performance of the method 800. Although illustrated as discrete blocks, various blocks in FIGS. 8A and 8B may be divided into additional blocks, combined into fewer blocks, or eliminated, depending on the desired implementation.

At block 802, a limited dataset may be received. The limited dataset may be received at an encoder. The limited dataset may include real data having one or more actual parameters and one or more actual sentences. For example, the limited dataset may include about 2000 sentence/user cases with fewer than about 100 unique reasons provided for a particular decision output. In some embodiments, the particular decision output describes an outcome regarding a loan application. At block 804, content data may be received. The content data may be received by the encoder in some embodiments. The content data may include a concept that is related to a portion of the real data or that causes an issue of the real data. At block 806, one or more relationships between the real data and the content data may be generated. The relationships may be generated by the encoder in some embodiments.

At block 808, the content data may be embedded with the real data. The content data may be embedded with the real data by the encoder in some embodiments. The content data may be embedded with the real data in an encoder output. The encoder output may include content vector embedding. In some embodiments, the content data is embedded with the real data in a single-level of conditioning. In other embodiments, the content data is embedded with the real data in two or more levels of conditional information. In these and other embodiments, the content data is embedded in a hierarchical fashion that includes a broad reasoning and a specific reasoning. Additionally, in these embodiments, the content vector embedding may include the broad reasoning concatenated with the specific reasoning.

At block 810, an additional parameter set may be generated. The additional parameter set may include one or more additional parameters and one or more additional statements. The additional parameter set may supplement the real data. Additionally the additional parameter set may be configured to enhance an expressiveness of a model. In some embodiments, the generating the additional parameter set includes modeling noise inputs as a mixture of Gaussians.

At block 812, explanatory statement may be generated. The explanatory statements may be generated based on the additional parameter set and the relationships in some embodiments. At block 814, applying a labeler loss function and anti-labeler loss function to the generated statements improve sematic and syntactic correctness of the generated statements. At block 816, the generated statement may be converted to an audio output. At block 818, the audio output may be communicated to a user during a network-based application interaction. At block 820, the generated statements may be evaluated. For example, the generated statements may be evaluated based on a comparison between real data and the additional parameter set. In some embodiments, the evaluating the generated statements may include generating synthetic data output of a binary signal that is used by a generator, which may improve or modify generated statements. At block 822, generating a decoder output from the encoder output. At block 824, it may be determined whether there is a mismatch between the decoder output and the real data. Responsive to there being a mismatch between the decoder output and the real data ("YES" at block 824), the method 800 may proceed to block 826. At block 826, an operation of the encoder may be altered. Responsive to there not being a mismatch between the decoder output and the real data ("No" at block 824), the method 800 may proceed to block 828 in which the method 800 may end. From block 824, the method 800 may proceed through one or more blocks (e.g., 806, 808, 810, 812, etc.) described above.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of generating text using an adversarial network, the method comprising:
   receiving a limited dataset that includes real data having one or more actual parameters and one or more actual sentences;
   further receiving content data that includes a concept that is related to a portion of the real data or that causes an issue of the real data;
   generating one or more relationships between the real data and the content data;
   embedding the content data with the real data in an encoder output that includes content vector embedding, wherein:
      the content data is embedded with the real data in two or more levels of conditional information;
      the content data is embedded in a hierarchical fashion that includes a broad reasoning and a specific reasoning; and
      the content vector embeds the broad reasoning concatenated with the specific reasoning;
   generating an additional parameter set that includes one or more additional parameters and one or more additional statements, the additional parameter set being supplemental to the real data and configured to enhance expressiveness of a model; and
   generating explanatory statements based on the additional parameter set and the relationships.

2. The method of claim 1, wherein the generating the additional parameter set includes modeling noise inputs as a mixture of Gaussians.

3. The method of claim 1, further comprising evaluating the generated statements based on a comparison between real data and the generated statements, wherein the evaluating the generated statements includes generating synthetic data output of a binary signal that is used by a generator to modify the generated statements.

4. The method of claim 1, further comprising applying a labeler loss function and anti-labeler loss function to the generated statements to modify sematic and syntactic correctness of the generated statements.

5. The method of claim 1, wherein the content data is embedded with the real data in a single-level of conditioning.

6. The method of claim 1, further comprising:
generating a decoder output from the encoder output; and
responsive to a mismatch between the decoder output and the real data, altering an operation of an encoder.

7. The method of claim 1, wherein the limited dataset includes 1000-3000 sentence/user cases with fewer than 40-500 unique reasons provided for a particular decision output.

8. The method of claim 1, wherein the limited dataset relates to:
an outcome regarding a loan application;
an explanation concerning an information technology help desk;
an explanation concerning an enterprise application; or an explanations concerning a financial decision.

9. The method of claim 1, further comprising:
converting the generated statement to an audio output; and
communicating the audio output to a user during a network-based application interaction.

10. A generative adversarial network (GAN) comprising:
an encoder configured to:
receive a limited dataset having real data and content data, the real data having one or more actual parameters and one or more actual sentences, and the content data includes a concept that is related to a portion of the real data or that causes an issue of the real data;
generate one or more relationships between the real data and the content data; and
embed the content data with the real data in an encoder output that includes content vector embedding, wherein:
the content data is embedded with the real data in two or more levels of conditional information;
the content data is embedded in a hierarchical fashion that includes a broad reasoning and a specific reasoning; and
the content vector embeds the broad reasoning concatenated with the specific reasoning;
a noise model configured to generate an additional parameter set that includes one or more additional parameters and one or more additional statements, the additional parameter set being supplemental to the real data and configured to enhance an expressiveness of a model; and
a generator configured to generate one or more explanatory statements based on the additional parameter set and the relationships generated by the encoder.

11. The GAN of claim 10, wherein the generating the additional parameter set includes modeling noise inputs as a mixture of Gaussians.

12. The GAN of claim 10, further comprising a discriminator that is configured to:
evaluate the generated statements based on a comparison between the real data and the additional parameter set; and
generate synthetic data output of a binary signal that is used by the generator to modify generated statements.

13. The GAN of claim 10, further comprising a labeler loss module and anti-labeler loss module configured to modify sematic and syntactic correctness of the generated statements.

14. The GAN of claim 10, wherein the content data is embedded with the real data in a single-level of conditioning.

15. The GAN of claim 10, further comprising a decoder configured to:
generate a decoder output from the encoder output; and
responsive to a mismatch between the decoder output and the real data, alter an operation of the encoder.

16. The GAN of claim 10, wherein the limited dataset includes 1000-3000 sentence/user cases with fewer than 40-500 unique reasons provided for a particular decision output.

17. The GAN of claim 10, wherein the limited dataset relates to:
an outcome regarding a loan application;
an explanation concerning an information technology help desk;
an explanation concerning an enterprise application; or an explanations concerning a financial decision.

18. The GAN of claim 10, further comprising a text-to-voice generator that is configured to:
convert one or more of the generated statements to an audio output; and
communicate the audio output to a user during a network-based application interaction.

* * * * *